United States Patent
Chung et al.

(10) Patent No.: US 12,063,320 B2
(45) Date of Patent: Aug. 13, 2024

(54) ELECTRONIC DEVICE

(71) Applicant: ASUSTeK COMPUTER INC., Taipei (TW)

(72) Inventors: Cheng-Han Chung, Taipei (TW);
Ching-Yuan Yang, Taipei (TW);
Chia-Min Cheng, Taipei (TW);
Chui-Hung Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 554 days.

(21) Appl. No.: 17/315,388

(22) Filed: May 10, 2021

(65) Prior Publication Data

US 2021/0360096 A1 Nov. 18, 2021

(30) Foreign Application Priority Data

May 12, 2020 (TW) ................. 109205767

(51) Int. Cl.
| | | |
|---|---|---|
| *H04M 1/02* | (2006.01) | |
| *F16M 11/04* | (2006.01) | |
| *F16M 11/10* | (2006.01) | |
| *F16M 11/12* | (2006.01) | |
| *F16M 11/18* | (2006.01) | |
| *G03B 17/56* | (2021.01) | |
| *H04N 23/57* | (2023.01) | |

(52) U.S. Cl.
CPC .......... *H04M 1/0264* (2013.01); *F16M 11/04* (2013.01); *F16M 11/10* (2013.01); *F16M 11/12* (2013.01); *F16M 11/18* (2013.01); *G03B 17/56* (2013.01); *H04N 23/57* (2023.01)

(58) Field of Classification Search
CPC ..... H04M 1/0264; H04N 23/57; F16M 11/04; F16M 11/12; F16M 11/10; F16M 11/18; G03B 17/56
USPC ........................................ 396/428
See application file for complete search history.

(56) References Cited

U.S. PATENT DOCUMENTS

| 4,440,403 | A | * | 4/1984 | Urano | G03B 17/08 |
|---|---|---|---|---|---|
| | | | | | 277/504 |
| 2012/0145871 | A1 | * | 6/2012 | Kawanishi | B60R 1/076 |
| | | | | | 248/479 |
| 2020/0329130 | A1 | * | 10/2020 | Choi | H04N 23/51 |

(Continued)

FOREIGN PATENT DOCUMENTS

| CN | 203926478 U | * | 11/2014 |
|---|---|---|---|
| CN | 203926478 U | | 11/2014 |
| CN | 204559666 U | * | 8/2015 |

(Continued)

*Primary Examiner* — Stephanie E Bloss
*Assistant Examiner* — Kevin C Butler
(74) *Attorney, Agent, or Firm* — McClure, Qualey & Rodack, LLP (57) ABSTRACT

An electronic device is provided in this disclosure. The electronic device includes a body, a shaft sleeve, a function module, and a rotating resistance device. The shaft sleeve is fixed to the body. The function module includes a shaft portion rotatably disposed on the shaft sleeve. The rotating resistance device is disposed on the shaft sleeve or fixed to the body and is against the shaft portion of the flip function module to apply rotational resistance to the shaft portion of the function module, so that the function module stably stays at any position without being affected by an external force.

11 Claims, 11 Drawing Sheets

(56) References Cited

U.S. PATENT DOCUMENTS

| | | | | |
|---|---|---|---|---|
| 2021/0014346 A1 * | 1/2021 | Choi | .................. | H04M 1/0277 |
| 2021/0360096 A1 * | 11/2021 | Chung | ................. | G06F 1/1686 |

FOREIGN PATENT DOCUMENTS

| | | | | | |
|---|---|---|---|---|---|
| CN | 204559666 | U | | 8/2015 | |
| EP | 3340586 | A1 | * | 6/2018 | .......... H04M 1/0264 |
| EP | 3396933 | A1 | * | 10/2018 | .......... H04M 1/0235 |
| EP | 3972229 | A1 | * | 3/2022 | .......... H04M 1/0264 |
| KR | 100703266 | B1 | * | 8/2005 | ............... H04B 1/38 |
| KR | 100703266 | B1 | | 4/2007 | |
| TW | 600509 | U | * | 8/2020 | .......... H04M 1/0264 |
| TW | M600509 | U | * | 8/2020 | ............. G03B 17/00 |
| TW | 708135 | B1 | * | 10/2020 | .......... H04M 1/0264 |
| TW | 1708135 | B | * | 11/2021 | ............... G06F 1/16 |
| WO | WO-2011022759 | | * | 8/2010 | |

* cited by examiner

ELECTRONIC DEVICE

CROSS-REFERENCE TO RELATED APPLICATION

This application claims the priority benefit of Taiwan Application Serial No. 109205767, filed on May 12, 2020. The entirety of the above-mentioned patent application is hereby incorporated by reference herein and made a part of specification.

BACKGROUND OF THE INVENTION

Field of the Invention

The disclosure provides an electronic device.

Description of the Related Art

In recent years, the industry has proposed various solutions to implement a full-screen smartphone, one of which is to use a flip camera. How to make the flip camera stay stably at any angle without easy rotation/shaking under the influence of an external force is one of goals that the related industry strives for.

BRIEF SUMMARY OF THE INVENTION

According to an aspect, an electronic device is provided. The electronic device includes a body, a shaft sleeve, a function module, and a rotating resistance device. The shaft sleeve is fixed to the body. The function module includes a shaft portion rotatably disposed on the shaft sleeve. The rotating resistance device is disposed on the shaft sleeve or fixed to the body and is against the shaft portion.

The electronic device according to the disclosure includes a rotating resistance device that is in press-fit with a shaft portion of a flip function module to apply rotational resistance to the shaft portion of the function module, so that the function module stably stays at any angle without easy rotation/shaking under the influence of an external force.

BRIEF DESCRIPTION OF THE DRAWINGS

To make the above and other objectives, features, advantages, and embodiments of the disclosure more comprehensible, descriptions of the accompanying drawings are provided as follows.

DETAILED DESCRIPTION OF THE EMBODIMENTS

For the sake of the completeness of the description of the disclosure, reference is made to the accompanying drawings and various embodiments described below. Various elements in the drawings are not drawn to scale and are provided merely to illustrate the disclosure. To provide full understanding of the disclosure, various practical details are explained in the following descriptions. However, a person of ordinary skill in the related art understands that the disclosure is implemented without one or more of the practical details. Therefore, these details are not used to limit the disclosure.

Figure 1:
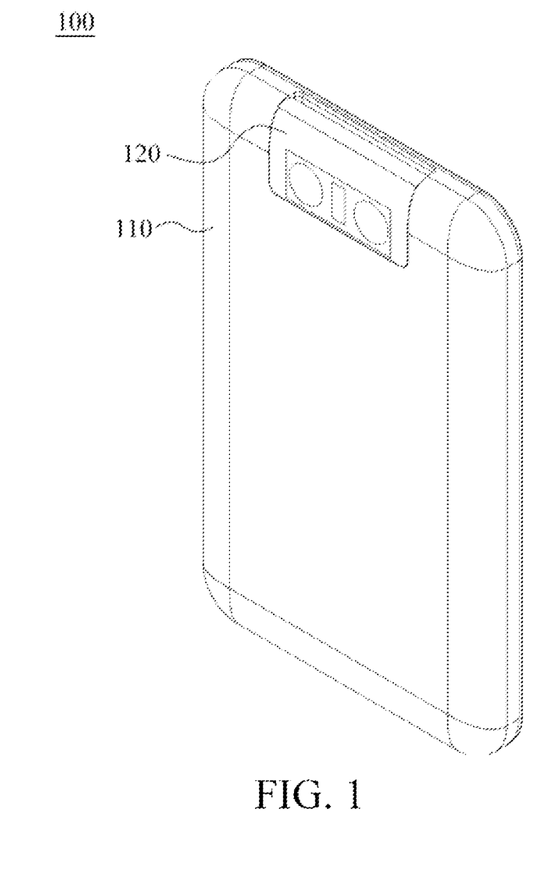
FIG. 1 and FIG. 2 are three-dimensional diagrams of an electronic device in two different operating states according to an embodiment of the disclosure.
Figure 2:
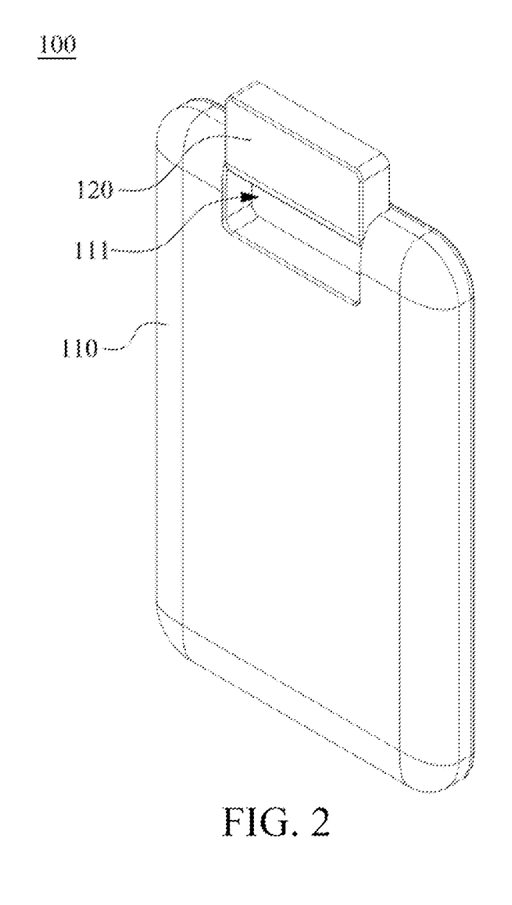

Referring to FIG. 1 and FIG. 2, an electronic device 100 (e.g., a smartphone) includes a body 110 and a function module 120. The body 110 includes a groove 111. The function module 120 is rotatably disposed on the body 110 and is received in the groove 111. In an embodiment, the function module 120 rotates within a range between a first position (as shown in FIG. 1, the functional module 120 is located in the groove 111) and a second position (as shown in FIG. 2, the functional module 120 extends to one side of the body 110) i. In an embodiment, the function module 120 includes an image capturing device with a photosensitive element, a lens, a flashlight to provide functions such as photographing and video recording. In an embodiment, the function module 120 serves as a rear lens when it is in the first position and the function module 120 serves as a front lens when it is in the second position. In an embodiment, the function module 120 includes a housing 129, and the image capturing device is mounted on the housing 129.

In an embodiment, the angle between the first position and the second position is 180 degrees. In other words, the function module 120 rotates 180 degrees from the first position to the second position. In an embodiment, the function module 120 also includes a loudspeaker or receiver (not shown) to provide functions such as voice playback/receiving.

Figure 3:
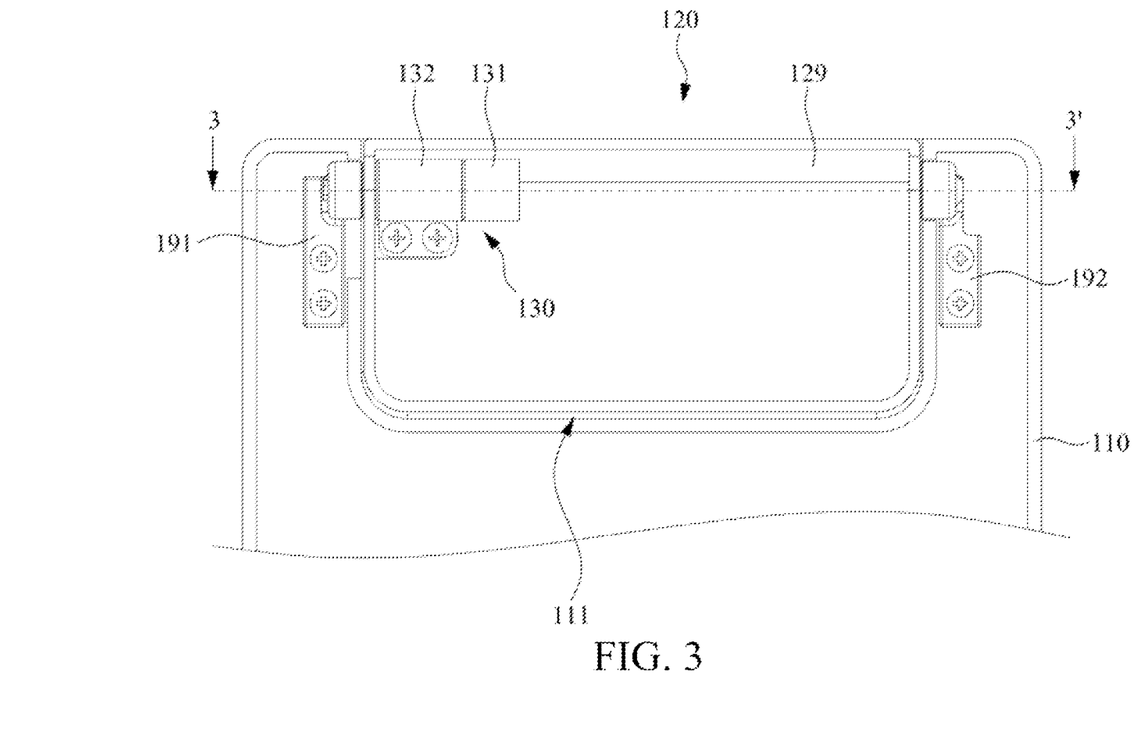
FIG. 3 is a schematic diagram of an internal structure of the electronic device in FIG. 1.
Figure 4:
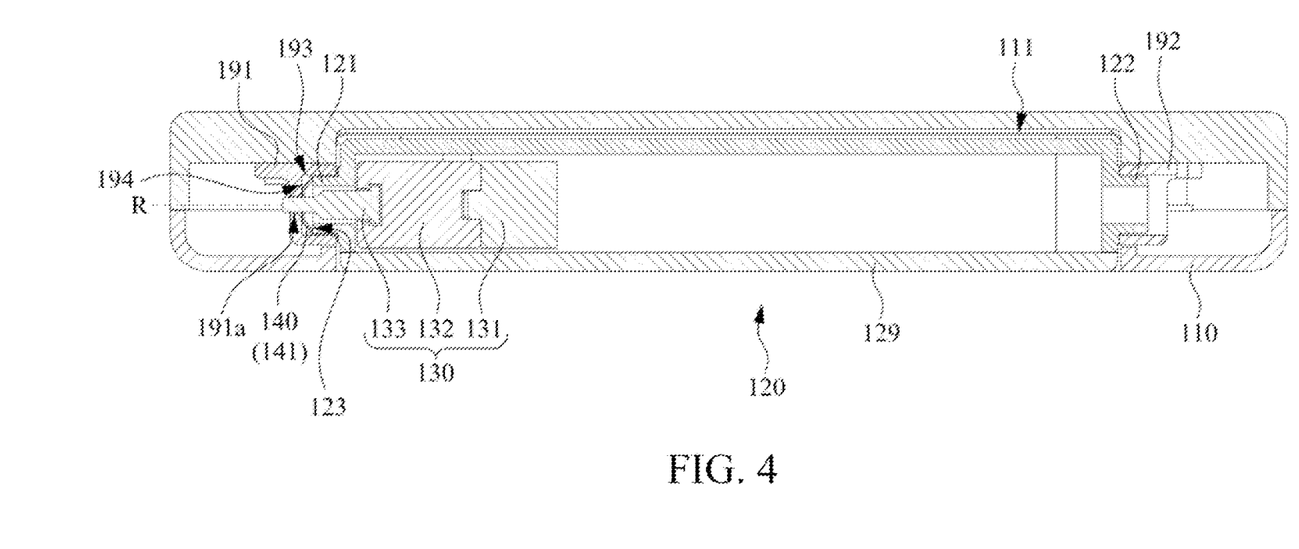
FIG. 4 is a cross-sectional view of the electronic device taken along line 3-3' in FIG. 3.

Referring to FIG. 3 and FIG. 4, the electronic device 100 further includes a motor assembly 130, a first shaft sleeve 191, and a second shaft sleeve 192. The first shaft sleeve 191 and the second shaft sleeve 192 are fixed to the body 110 (in an embodiment. The first shaft sleeve 191 and the second shaft sleeve 192 are secured to the body 110 by fasteners such as screws) and located on two opposite sides of the groove 111. The housing 129 of the function module 120 includes a first shaft portion 121 and a second shaft portion 122 opposite to each other, and the first shaft portion 121 is rotatably disposed on the first shaft sleeve 191 and the second shaft portion 122 are rotatably disposed on the second shaft sleeve 192.

As shown in FIG. 3 and FIG. 4, the motor assembly 130 is disposed in the function module 120 (in an embodiment, the motor assembly 130 is secured to the housing 129 of the function module 120 by fasteners such as screws) and includes a motor 131, a power transfer module 132, and an output shaft 133. The motor 131 is a power source, and the power transfer module 132 is connected between the motor 131 and the output shaft 133 and transmits the output of the motor 131 to the output shaft 133. The output shaft 133 passes through the first shaft portion 121 and is engaged with the first shaft sleeve 191, so that the motor assembly 130 drives the function module 120 to rotate about an axis R with respect to the body 110.

In an embodiment, the first shaft sleeve 191 includes a through hole 191a, and the output shaft 133 is engaged with the through hole 191a. In an embodiment, the power transfer module 132 includes a gearbox. In an embodiment, the power transfer module 132 includes a speed reduction mechanism.

Manufacturing tolerances of internal parts such as gears of the motor assembly 130, and a clearance between the output shaft 133 and the through hole 191a of the first shaft sleeve 191 cause an idle stroke of rotation of the function module 120, so that the function module 120 rotates and cannot stably stay at an position when the electronic device 100 is applied an external force. In an embodiment, when the electronic device 100 is placed on a vehicle, the function module 120 located in the groove 111 of the body 110 rotates out of the groove 111 due to vibration of the vehicle.

Therefore, as shown in FIG. 4, the electronic device 100 further includes a rotating resistance device 140 disposed on the first shaft sleeve 191. The rotating resistance device 140 is against with the first shaft portion 121. The rotating resistance device 140 applies rotational resistance to the first shaft portion 121. Specifically, the frictional resistance between the rotating resistance device 140 and the first shaft portion 121 prevents the function module 120 from rotating, so that the function module 120 stably stays at any position without being affected by an external force, thereby preventing the function module 120 from rotating out of the groove 111 and also facilitating development of other application functions such as soft functions with high stability requirements and continuous changes in photographing angles.

In the electronic device 100, the first shaft sleeve 191 is fixed to the body 110, the motor assembly 130 is fixed to the housing 129, and the output shaft 133 of the motor assembly 130 is engaged with the through hole 191a of the first shaft sleeve 191. The disclosure solves the idle stroke problem of rotation caused by internal gears of the motor assembly 130 and the engagement between the output shaft 133 and the through hole 191a by using the rotating resistance device 140 to generate frictional resistance between the first shaft portion 121 of the housing 129 of the function module 120 and the first shaft sleeve 191 fixed to the body 110.

As shown in FIG. 4, in an embodiment, the first shaft sleeve 191 includes a concave hole 193, the first shaft portion 121 and the rotating resistance device 140 located in the concave hole 193, and the rotating resistance device 140 is disposed between the first shaft sleeve 191 and the first shaft portion 121 and against the first shaft sleeve 191 and the first shaft portion 121. In an embodiment, the rotating resistance device 140 includes an elastic element 141 abutted against a bottom surface 194 of the concave hole 193 and an end surface 123 of the first shaft portion 121. In the embodiment shown in FIG. 4, the elastic element 141 is a Belleville washer, and the inner edge and the outer edge of the elastic element 141 are abutted against the bottom surface 194 of the concave hole 193 and the end surface 123 of the first shaft portion 121, respectively. A through hole is provided at the center of the washer, and the output shaft 133 of the motor assembly 130 extends through the through hole at the center of the washer to be engaged with the first shaft sleeve 191.

Figure 5:
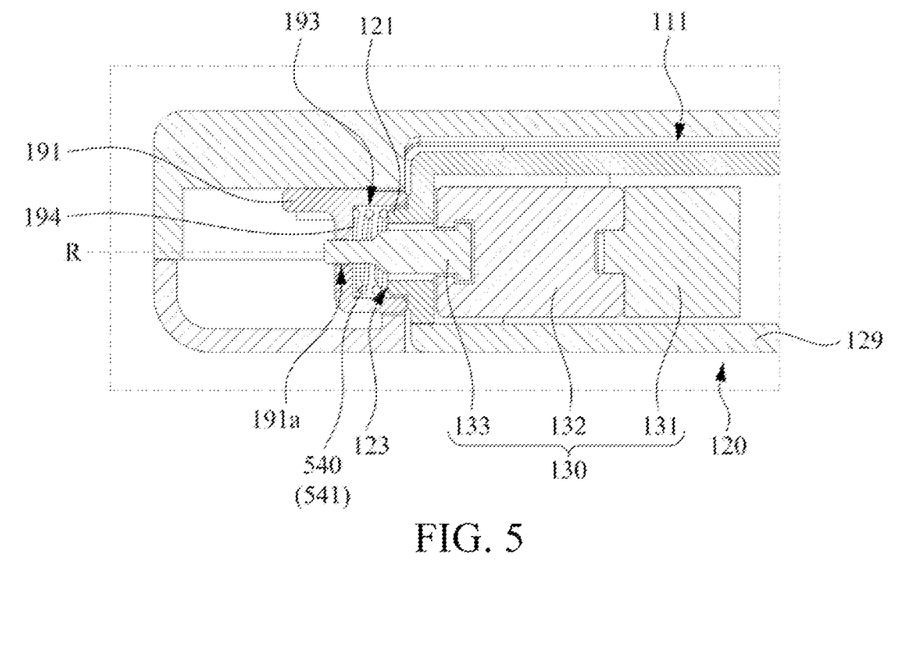
FIG. 5 is a partially enlarged cross-sectional view of an electronic device according to another embodiment of the disclosure.

Referring to FIG. 5, a difference between the embodiment shown in FIG. 5 and the foregoing embodiments is that the elastic element 541 of a rotating resistance device 540 is a tension spring, and the tension spring is against the bottom surface 194 of the concave hole 193 and the end surface 123 of the first shaft portion 121. Specifically, two ends of the tension spring are abutted against the bottom surface 194 of the concave hole 193 and the end surface 123 of the first shaft portion 121, respectively. The output shaft 133 of the motor assembly 130 passes through the tension spring to be engaged with the first shaft sleeve 191.

Figure 6:
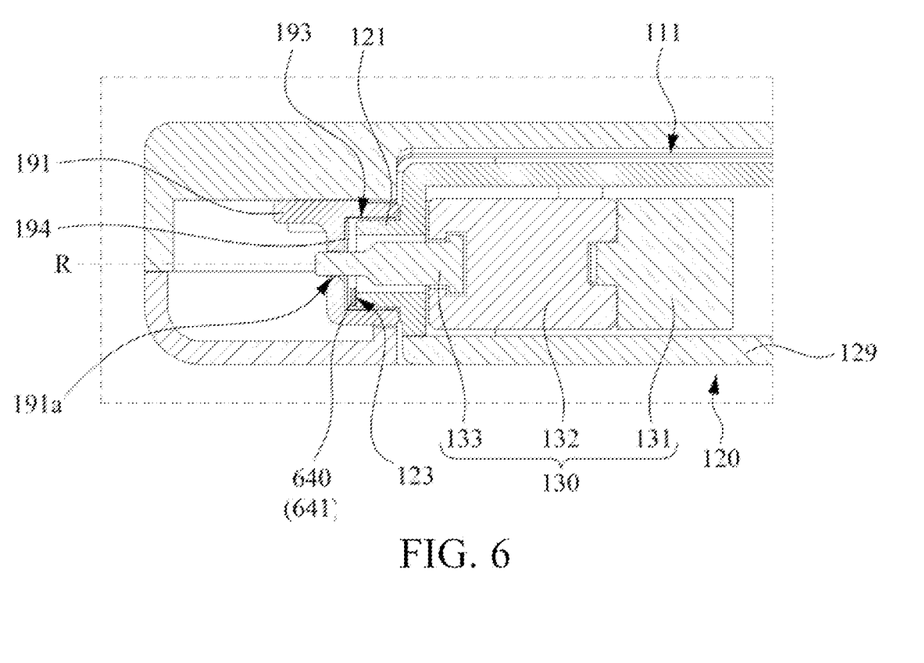
FIG. 6 is a partially enlarged cross-sectional view of an electronic device according to another embodiment of the disclosure.

Referring to FIG. 6, a difference between the embodiment shown in FIG. 6 and the foregoing embodiments is that the elastic element 641 of a rotating resistance device 640 is a helical washer (e.g., a split washer) which is against the bottom surface 194 of the concave hole 193 and the end surface 123 of the first shaft portion 121. Specifically, two ends of the helical washer are abutted against the bottom surface 194 of the concave hole 193 and the end surface 123 of the first shaft portion 121, respectively. The output shaft 133 of the motor assembly 130 passes through the helical washer to be engaged with the first shaft sleeve 191.

Figure 7:
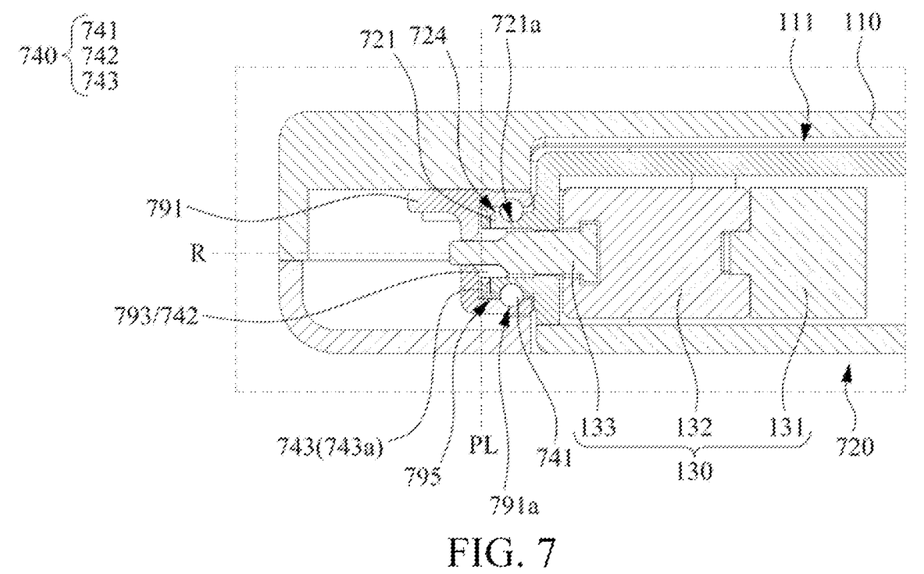
FIG. 7 is a partially enlarged cross-sectional view of an electronic device according to another embodiment of the disclosure.

Referring to FIG. 7, a difference between the embodiment shown in FIG. 7 and the foregoing embodiments is that the resistance device 740 includes a rubber ring 741 (e.g., an O-ring) surrounding a first shaft portion 721 of a function module 720. The rubber ring 741 is against an inner circumferential surface 795 of a concave hole 793 of a first shaft sleeve 791 and an outer peripheral surface 724 of the first shaft portion 721. In an embodiment, the first shaft portion 721 includes a recess 721a, the first shaft sleeve 791 includes a recess 791a, and the rubber ring 741 is clamped between the recess 721a and the recess 791a.

As shown in FIG. 7, in an embodiment, the rotating resistance device 740 further includes viscous liquid 742 such as damping oil or other highly viscous liquid, and the viscous liquid 742 is filled among the first shaft sleeve 791, the first shaft portion 721, and the rubber ring 741. The viscous liquid 742 increases the rotational resistance of the rotating resistance device 740 applied to the function module 720 to maintain the position of the function module 720.

As shown in FIG. 7, in an embodiment, the rotating resistance device 740 further includes a friction plate 743 fixed to the first shaft portion 721 and immersed in the viscous liquid 742. The friction plate 743 further increases the rotational resistance of the rotating resistance device 740 applied to the function module 720 to maintain the position of the function module 720.

As shown in FIG. 7, in an embodiment, the friction plate 743 includes a disc-shaped portion 743a located on a plane PL that is substantially perpendicular to the axis R. In an embodiment, the friction plate 743 is a metal sheet.

Figure 8:
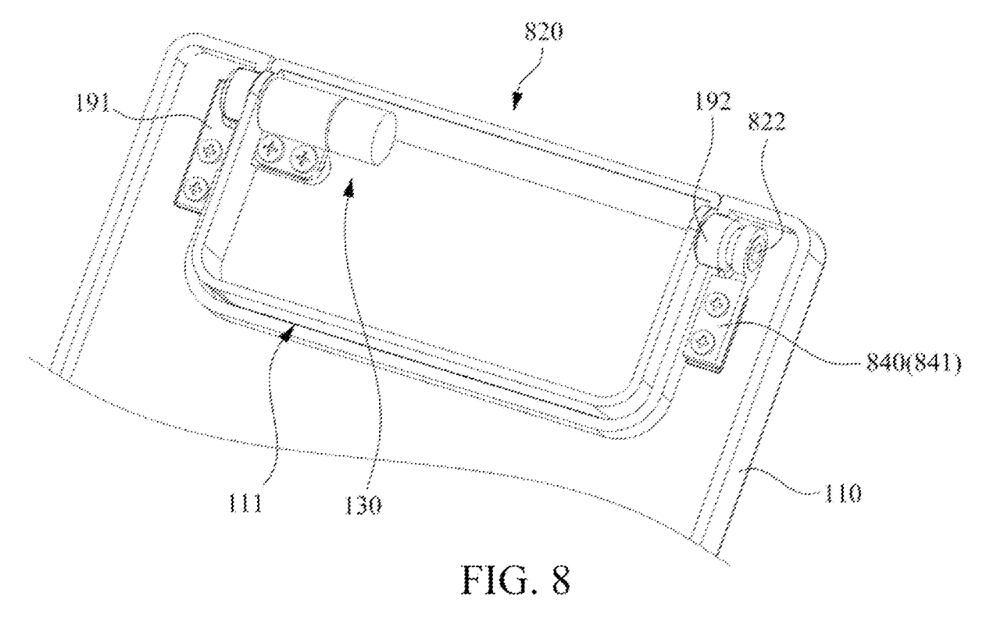
FIG. 8 is a three-dimensional diagram of an electronic device according to another embodiment of the disclosure.

Referring to FIG. 8, a difference between the embodiment shown in FIG. 8 and the foregoing embodiments is that a second shaft portion 822 of a function module 820 passes through a second shaft sleeve 192, and the second shaft portion 822 includes a segment exposed from the second shaft sleeve 192 (in the embodiment shown in FIG. 8, the second shaft sleeve 192 is sleeved at the left end of the second shaft portion 822, and the exposed segment is located at the right end of the second shaft sleeve 192).

As shown in FIG. 8, a difference between the embodiment shown in FIG. 8 and the foregoing embodiments is that a rotating resistance device 840 includes a plastic element 841, the plastic element 841 is fixed to the body 110, and the plastic element 841 is sleeved on and against the exposed segment of the second shaft portion 822. In other words, the plastic element 841 is against the second shaft portion 822. The plastic element 841 applies rotational resistance (frictional resistance) to the second shaft portion 822 to maintain the position of the function module 820.

In an embodiment, the plastic element 841 is secured to the body 110 by fasteners such as screws. In an embodiment, the second shaft sleeve 192 includes a metal material such that the second shaft sleeve 192 has a good reliability. In an embodiment, the plastic element 841 includes polyoxymethylene (POM). In an embodiment, the plastic element 841 and the second shaft sleeve 192 are two parts on the same part. The materials of the two parts are different.

Figure 9:
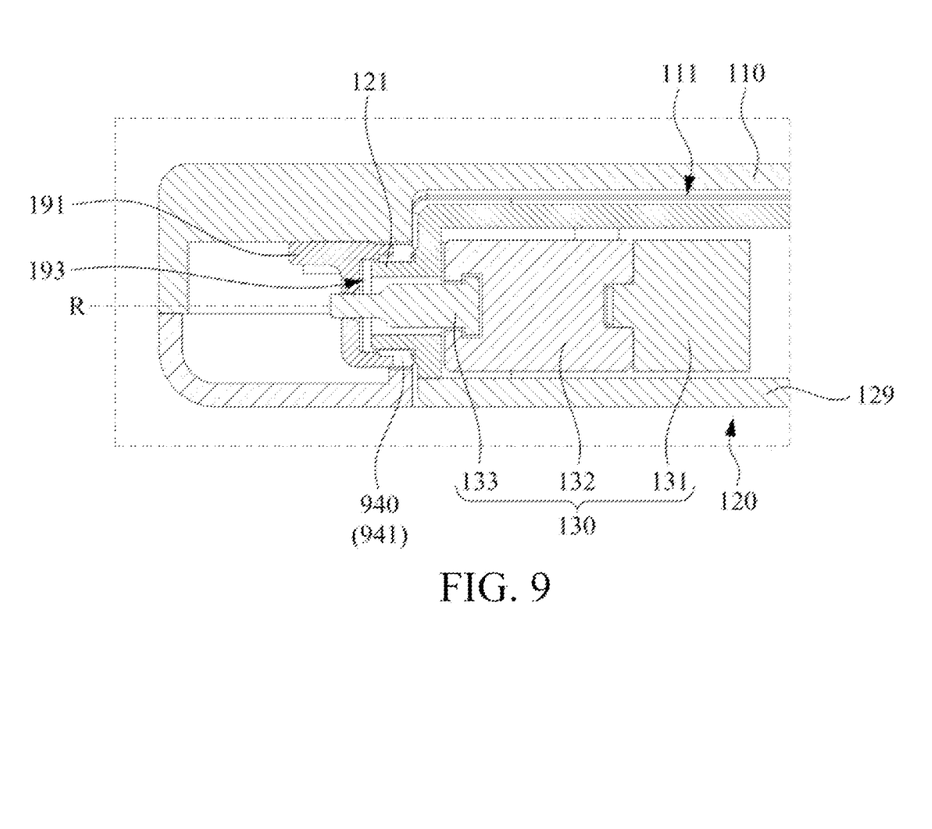
FIG. 9 is a partially enlarged cross-sectional view of an electronic device according to another embodiment of the disclosure.

Referring to FIG. 9, a difference between the embodiment shown in FIG. 9 and the foregoing embodiments is that a rotating resistance device 940 includes a plastic element 941, the plastic element 941 is embedded into the first shaft sleeve 191, and the plastic element 941 is sleeved on and pressed against the first shaft portion 121. In an embodiment, the plastic element 941 has an annular structure and is disposed along the top end of a concave hole 193 of the first shaft sleeve 191. In an embodiment, the first shaft sleeve 191 includes a metal material, and the plastic element 941 is formed on the first shaft sleeve 191 in an injection molding manner. In an embodiment, the plastic element 941 includes POM.

Figure 10:
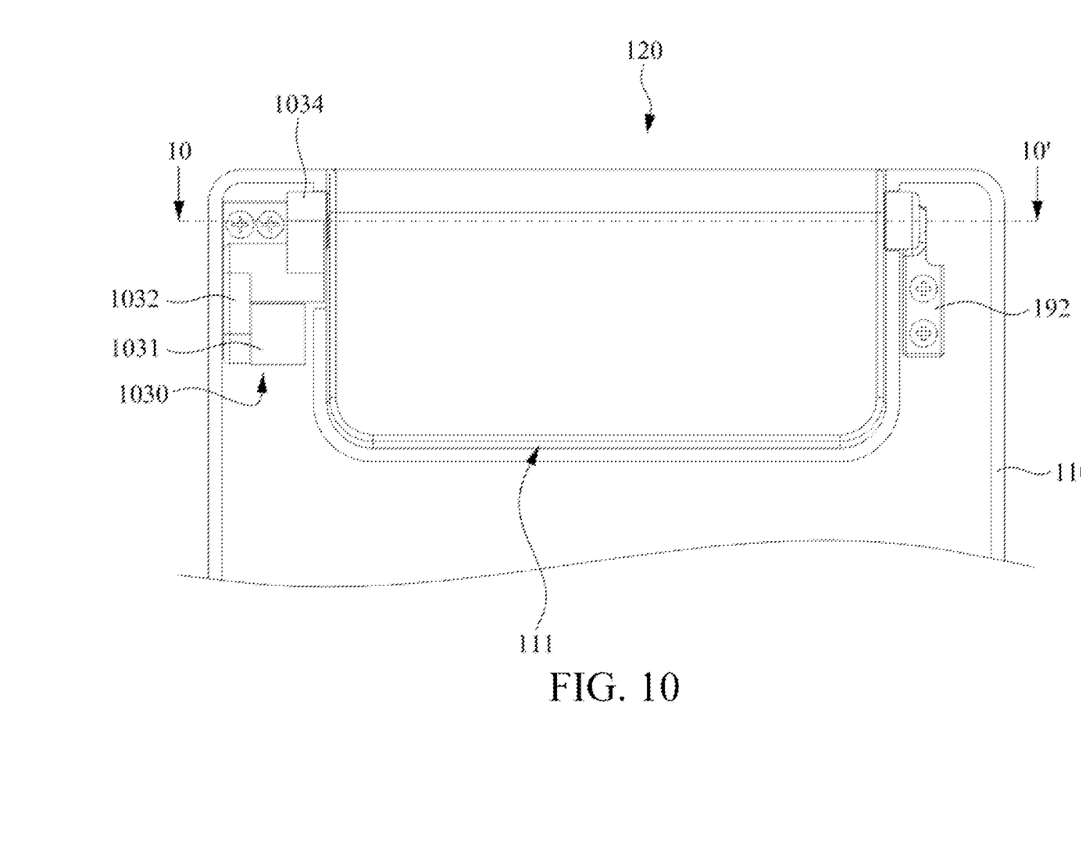
FIG. 10 is a schematic diagram of an internal structure of an electronic device according to another embodiment of the disclosure.
Figure 11:
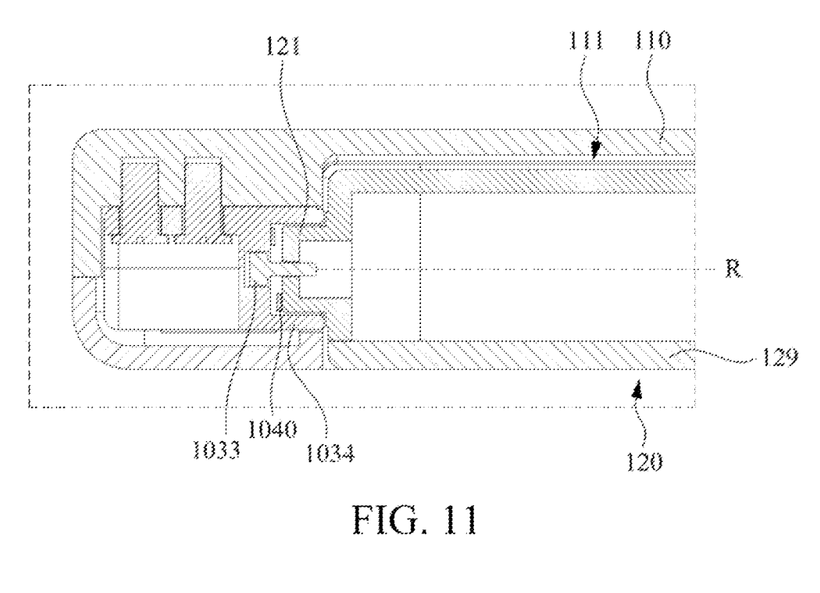
FIG. 11 is a cross-sectional view of the electronic device taken along line 10-10' in FIG. 10.

Referring to FIG. 10 and FIG. 11, a difference between the embodiment shown in FIG. 10 and the foregoing embodiments is that a motor assembly 1030 of an electronic device 1000 is disposed on the body 110 (e.g., the motor assembly 1030 is secured to the body 110 by fasteners such as screws) and engaged with the function module 120 to drive the function module 120 to rotate about the axis R with respect to the body 110. The motor assembly 1030 includes a motor 1031, a power transfer module 1032, and an output shaft 1033 with similar functions to the motor 131, the power transfer module 132, and the output shaft 133 of the motor assembly 130.

As shown in FIG. 11, the motor assembly 1030 includes a sleeve structure 1034 as the shaft sleeve. In other words, the function of the sleeve structure 1034 is equivalent to that of the first shaft sleeve 191 in the embodiment shown in FIG. 3. The sleeve structure 1034 is configured to receive the first shaft portion 121 of the function module 120, and the output shaft 1033 extends out of the bottom of the sleeve structure 1034 and is engaged with the first shaft portion 121, thereby driving the function module 120 to rotate. A rotating resistance device 1040 is against the sleeve structure 1034 and the first shaft portion 121, thereby applying rotational resistance to the first shaft portion 121 to maintain the position of the function module 120. In an embodiment, the sleeve structure 1034 and a housing of the motor assembly 1030 are integrally formed. In other words, the sleeve structure 1034 is a structure on the housing of the motor assembly 1030.

It is to be noted that, in the embodiment shown in FIG. 11, taking the rotating resistance device 1040 to be the helical washer as an example, other rotating resistance devices in the foregoing embodiments which include the Belleville washer (the elastic element 541), the tension spring (the elastic element 641), the rubber ring 741 (or further including the viscous liquid 742 and the friction plate 743), the plastic element 841 fixed to the body and in press-fit with the second shaft portion, and the plastic element 941 embedded into the first shaft sleeve are also applied to the electronic device 1000, and also have the effect of applying rotational resistance to the function module 120 to maintain the position of the function module 120.

In conclusion, the electronic device of the disclosure includes the rotating resistance device, and the rotating resistance device is against the shaft portion of the flip function module to apply rotational resistance to the shaft portion of the function module, so that the function module stably stays at any position without being affected by an external force.

Although the disclosure has been disclosed above by using the embodiments, the embodiments are not used to limit the disclosure. Any person skilled in the art may make various variations and modifications without departing from the spirit and scope of the disclosure. Therefore, the protection scope of the disclosure is defined by the appended claims.

What is claimed is:

1. An electronic device, comprising:
a body;
a shaft sleeve, fixed to the body and having a hole;
a function module, comprising a shaft portion rotatably disposed in the hole of the shaft sleeve;
a motor assembly, configured to drive the function module to rotate with respect to the body; and
a rotating resistance device, disposed on the shaft sleeve or fixed to the body,
wherein, the rotating resistance device presses against an outer surface of the shaft portion to apply frictional resistance to the shaft portion of the function module.

2. The electronic device according to claim 1, wherein the hole of the shaft sleeve is a concave hole, the shaft portion and the rotating resistance device are located in the concave hole, and the rotating resistance device is disposed between the shaft sleeve and the shaft portion and against the shaft sleeve and the shaft portion.

3. The electronic device according to claim 2, wherein the rotating resistance device comprises an elastic element against a bottom surface of the concave hole and an end surface of the shaft portion.

4. The electronic device according to claim 3, wherein the elastic element comprises a tension spring, a washer, or a combination thereof.

5. The electronic device according to claim 2, wherein the rotating resistance device comprises a rubber ring against an inner circumferential surface of the concave hole and an outer peripheral surface of the shaft portion.

6. The electronic device according to claim 5, wherein the rotating resistance device further comprises viscous liquid that is filled among the shaft sleeve, the shaft portion, and the rubber ring.

7. The electronic device according to claim 6, wherein the rotating resistance device further comprises a friction plate fixed to the shaft portion and immersed in the viscous liquid.

8. The electronic device according to claim 1, wherein the rotating resistance device comprises a plastic element embedded into the shaft sleeve, and the plastic element is sleeved on and against the shaft portion.

9. The electronic device according to claim 1, wherein the shaft portion passes through the shaft sleeve, the shaft portion comprises a segment exposed from the shaft sleeve, the rotating resistance device comprises a plastic element, the plastic element is fixed to the body, and the plastic element is sleeved on and against the segment of the shaft portion.

10. The electronic device according to claim 1, further comprising:
  a motor assembly, disposed in the function module and comprising an output shaft, wherein, the output shaft passes through the shaft portion and the rotating resistance device and is engaged with the shaft sleeve.

11. The electronic device according to claim 1, further comprising:
  a motor assembly, disposed in the body and comprising a sleeve structure and an output shaft,
  wherein, the sleeve structure is served as the shaft sleeve, and the output shaft extends out of the sleeve structure and is engaged with the shaft portion.

\* \* \* \* \*